United States Patent
Kitamura et al.

(10) Patent No.: US 7,274,789 B2
(45) Date of Patent: Sep. 25, 2007

(54) INFORMATION RECORDING/REPRODUCING APPARATUS WITH SECURITY MEASURE

(75) Inventors: Minoru Kitamura, Hamamatsu (JP); Shinya Sakurada, Hamamatsu (JP); Susumu Ishibashi, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 844 days.

(21) Appl. No.: 10/613,202

(22) Filed: Jul. 3, 2003

(65) Prior Publication Data

US 2004/0025041 A1 Feb. 5, 2004

(30) Foreign Application Priority Data

Jul. 10, 2002 (JP) ............................. 2002-201765

(51) Int. Cl.
*H04L 9/00* (2006.01)
(52) U.S. Cl. ........................................ 380/202; 705/58
(58) Field of Classification Search ................ 380/202, 380/203; 705/58
See application file for complete search history.

(56) References Cited

U.S. PATENT DOCUMENTS

| | | | | |
|---|---|---|---|---|
| 5,148,416 A | * | 9/1992 | Hoshino et al. | 369/30.12 |
| 5,379,433 A | * | 1/1995 | Yamagishi | 726/30 |
| 5,805,699 A | * | 9/1998 | Akiyama et al. | 705/58 |
| 6,687,826 B1 | * | 2/2004 | Owa | 713/193 |
| 6,772,133 B1 | * | 8/2004 | Kambayashi et al. | 705/57 |
| 7,043,473 B1 | * | 5/2006 | Rassool et al. | 707/6 |
| 2002/0141583 A1 | * | 10/2002 | Barnard et al. | 380/202 |

OTHER PUBLICATIONS

Norihisa Aoki, et al, "Performance Data Transmission Controlling Apparatus, and Electronic Musical Instrument Capable of Acquiring Performance Data", U.S. Appl. No. 10/339,590 filed Jan. 9, 2003.

* cited by examiner

*Primary Examiner*—Matthew B Smithers
(74) *Attorney, Agent, or Firm*—Morrison & Foerster LLP

(57) ABSTRACT

When data are to be recorded on a recording medium having imparted thereto a medium ID that is identification information unique to the recording medium, an additional ID related to the medium ID is generated on the basis of the medium ID. Then, the data are encrypted and recorded on the medium along with the additional ID. In reproduction, the medium ID and the additional ID attached to the data are read out from the medium, and then compared to determine whether both of the medium ID and additional ID meet a predetermined matching condition. When the additional ID attached to the data has been determined as meeting the predetermined matching condition, the data is judged to be reproducible data. In this manner, it is possible to promptly determined whether or not the data recorded on the medium are fairly-recorded data, which can effectively prevent unfair use of the data.

8 Claims, 3 Drawing Sheets

INFORMATION RECORDING/REPRODUCING APPARATUS WITH SECURITY MEASURE

BACKGROUND OF THE INVENTION

The present invention relates to information recording apparatus for recording data on a recording medium in encrypted form and information reproducing apparatus for reproducing data recorded on a recording medium, as well as programs to be executed by a computer for recording and/or reproducing data to and from a recording medium.

In recent years, it has been widely popular to deliver various digital content, such as music and image content, via the Internet and various other communication networks. Under such an environment, any interested user can purchase or acquire desired content (e.g., music piece data) by downloading, via such a communication network, the desired content from information provider that supply music content and the like. Further, with recent advancement of data compression techniques, it is possible to record content, acquired via the Internet, on a physical medium (recording medium) with high quality. Under such circumstances and from the viewpoints of copyright protection etc., there is a great demand today for techniques to effectively prevent unfair or unauthorized copying and use of digital content.

As a technique for preventing such unfair or unauthorized copying and use of digital content, it has been known to employ a recording medium having a unique medium ID imparted thereto, such as Smart Media (registered trademark). More specifically, it has been known that data of downloaded content to be recorded on a recording medium are encrypted by use of the medium ID unique to the recording medium, and, in reproduction of the recorded content, the encrypted data of the content are decrypted using the unique medium ID of the recording medium. In this case, if downloaded to the recording medium in a fair (rightful) manner, the content can be appropriately decrypted and reproduced from the recording medium, because the medium ID used for decrypting the content coincides with the unique medium ID used for encrypting the content. If, on the other hand, particular content is first downloaded to the recording medium in a fair (rightful) manner and then unfairly (unrightfully) copied from the recording medium to another recording medium, then the data of the content read out from the other recording medium can not be appropriately decrypted, because the medium ID unique to the other recording medium is different from the unique medium ID used for encrypting the content; thus, the content can not be reproduced from the other recording medium. In this way, the known technique can prevent unfair copying of the content.

However, the aforementioned conventionally-known technique is disadvantageous in that, before all recorded data of content to be reproduced from a given recording medium have been decrypted, it can not determine whether the data are fairly-recorded data, i.e. reproducible (more specifically, reproduction-permissible) data. Because decrypting the data is quite time-consuming, the conventionally-known technique would lack processing quickness.

SUMMARY OF THE INVENTION

In view of the foregoing, it is an object of the present invention to provide an information recording apparatus, information reproducing apparatus and computer program which, through simple and efficient processing, can effectively prevent unfair or unauthorized copying, use, etc. of data.

In order to accomplish the above-mentioned object, the present invention provides an information recording apparatus, which comprises: an encryption section that encrypts data to be recorded on a recording medium; a generation section that, on the basis of a medium ID recorded on the recording medium as identification information unique to the recording medium, generates an additional ID related to the medium ID; and a recording section that records the encrypted data on the recording medium along with the additional ID.

The present invention also provides an information reproduction apparatus for reproducing data recorded on a recording medium, which comprises: a first readout section that reads out, from the recording medium, a medium ID recorded on the recording medium as identification information unique to the recording medium, an additional ID related to the medium ID being also recorded on the recording medium in attached relation to the data; a second readout section that reads out, from the recording medium, the additional ID attached to the data; a determination section that compares the medium ID and the additional ID read out by the first and second readout sections and determines whether both the medium ID and the additional ID meet a predetermined matching condition. When the additional ID attached to the data has been determined by the determination section as meeting the predetermined matching condition, the data is judged to be reproducible.

With the arrangements that an additional ID, related to a medium ID recorded on a recording medium as identification information unique to the recording medium, is generated on the basis of the medium ID and encrypted data are recorded on the recording medium along with the thus-generated additional ID, the present invention can enhance the security of the data recorded on the recording medium. Further, in reproduction, the present invention can promptly ascertain the fairness or rightfulness of the data recorded on the recording medium by just comparing the medium ID and additional ID to check the authenticity of the additional ID, without having to decrypt all of the data recorded on the recording medium, thereby achieving high-speed processing.

The present invention may be constructed and implemented not only as the apparatus invention as discussed above but also as a method invention. Also, the present invention may be arranged and implemented as a software program for execution by a processor such as a computer or DSP, as well as a recording medium storing such a software program. Further, the processor used in the present invention may comprise a dedicated processor with dedicated logic built in hardware, not to mention a computer or other general-purpose type processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the object and other features of the present invention, its preferred embodiments will be described hereinbelow in greater detail with reference to the accompanying drawings, in which.

DETAILED DESCRIPTION OF THE EMBODIMENTS

Whereas the present invention will be described hereinbelow as directed to recording music piece data on a recording medium, the data to be recorded on the recording medium may be any other desired digital content, such as image data. Further, although the present invention will be described in relation to recording and reproduction, to and from a recording medium, of music piece data downloaded from a music content supply system via a communication network, the invention is not so limited.

Figure 1:
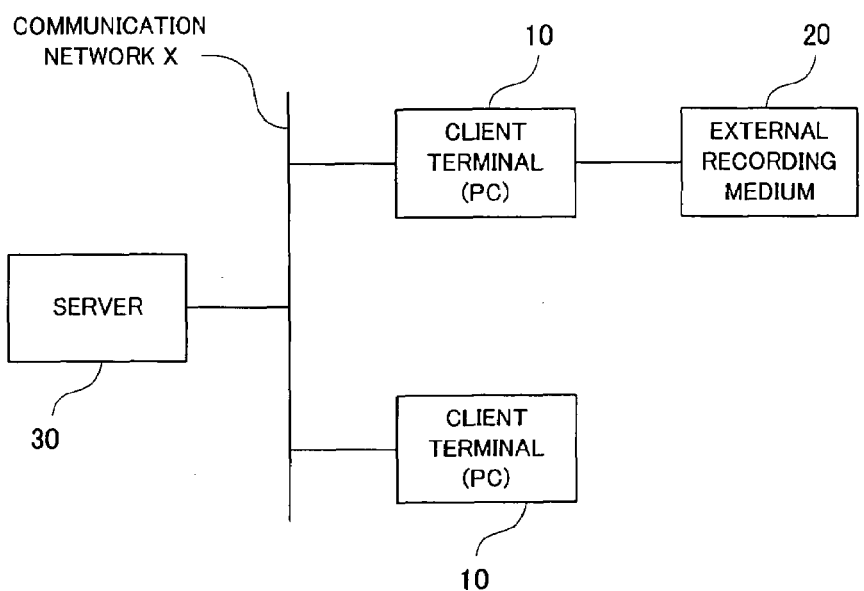
FIG. 1 is a block diagram showing an example of network connection in a music content supply system in accordance with an embodiment of the present invention.
Figure 2:
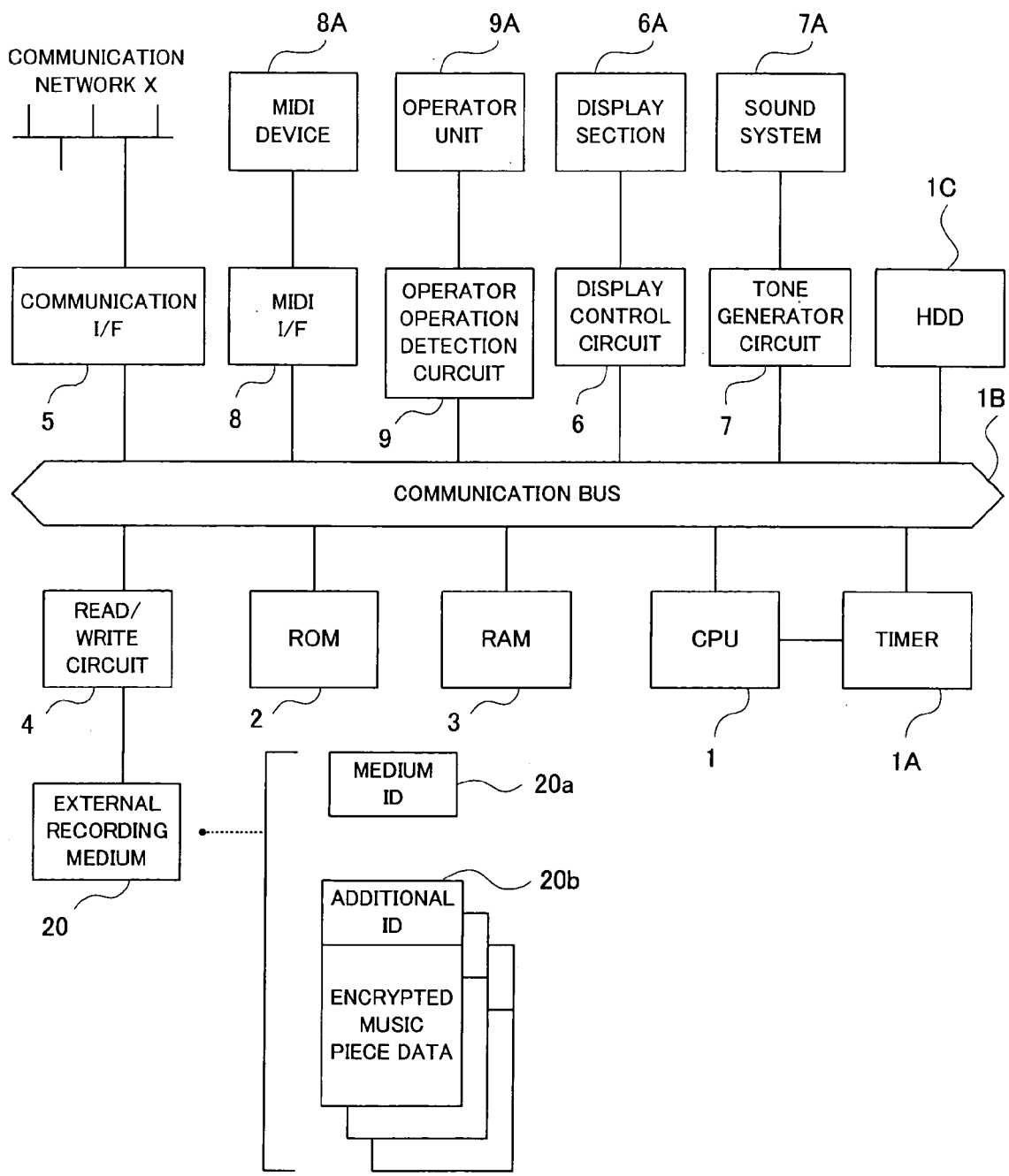
FIG. 2 is a block diagram showing an example hardware setup of a computer usable as a client terminal.

FIG. 1 is a block diagram showing an example of network connection in a music content supply system in accordance with an embodiment of the present invention. FIG. 2 is a block diagram showing an example hardware setup of a computer (PC) usable as a client terminal.

In FIG. 1, a server 30 that supplies music piece data (music content) is connected to a communication network X, and each of a plurality of client terminals 10 can access the server 30 via the communication network X. The server 30 is a music information provider having a plurality of music piece data sets or files (music content), which, in response to a music-piece-data supply request sent from any one of the client terminals 10, transmits a user-desired music piece data set to the client terminal 10. Each of the client terminals 10, connected to the server 30 via the communication network X, can acquire a user-desired music piece data set (music content) by downloading the user-desired music piece data set from the server 30; the acquisition may be either on a chargeable basis or on a free-of-charge basis. External recording medium 20 is connected to each of the client terminals 10, so that each of the client terminals 10 can record music piece data, downloaded from the server 30, on the external recording medium 20. In the present invention, each set or file of music piece data to be recorded is imparted with an additional ID based on a medium ID unique to the recording medium 20 and then recorded on the recording medium 20 along with the additional ID, as will be later described in detail.

As shown in FIG. 2, each of the client terminal 10 includes a CPU 1, to which are connected, via a communication bus 1B, a ROM 2, a RAM 3, a read/write circuit 4, a communication interface 5, a display control circuit 6, a tone generator circuit 7, a MIDI interface 8, an operator operation detection circuit 9, a hard disk drive (HDD) 1, etc. To the CPU 1 is also connected a timer 1A for signaling predetermined interrupt timing for timer interrupt processing and counting various times. External recording medium 20 is removably connected to the client terminal 10 via the read/write circuit 4.

The CPU 1 executes various programs stored in any of memories, such as the ROM 2 and RAM 3. Among these programs are information recording and/or reproducing programs for use in the embodiment of the present invention, as will be later described.

Each of the client terminals 10 is connected via the communication interface (I/F) 5 to the communication network X, such as the Internet, LAN or telephone line, and the client terminal 10 can communicate various content, such as various programs, music piece data, etc. with the server 30 via the communication network X. Any of information recording and/or reproducing programs and various other programs for use in the embodiment of the present invention can also be downloaded from the server 30 via the communication interface 5. In such a case, the downloaded program etc. are stored in the hard disk device (HDD) 1 or the like, then transferred to the RAM 3 when the program is to be executed, and then actually executed under control of the CPU 1. Such arrangements facilitate addition, to the client terminal 10, of any of the information recording and/or reproducing programs and various other programs for use in the embodiment of the present invention, version upgrade of any of the programs, etc. Note that each music piece data content downloaded from the server 30 is received via the communication interface 5, temporarily stored in the RAM 3, subjected to later-described predetermined processing, such as encryption and impartment of an additional ID, and then recorded on the external recording medium 20 via the read/write circuit 4. The music piece data content temporarily stored in the RAM 3 disappears after having been recorded on the recording medium 20.

The display control circuit 6 causes a display section 6A to visually display various information under control of the CPU 1; for example, the display section 6A is used to display a listing of one or more music piece data sets (music piece data files) recorded on the external recording medium 20. The tone generator circuit 7 is capable of generating tone signals on the basis of tone data given via the communication bus 1B, and each of the thus-generated tone signals is audibly reproduced or sounded through a sound system 7A including an amplifier and speaker. Note that the tone generator circuit 7 may generate tone signals using any suitable conventionally-known tone signal generation method, such as the waveform memory method, FM method, physical model method, harmonics synthesis method, formant synthesis method, analog synthesizer method or analog synthesizer simulation method. Further, the tone generator circuit 7 may be implemented either by dedicated hardware or by software processing executed by the CPU 1. The MIDI interface (MIDI I/F) 8 is intended for input/output of data complying with the MIDI standard, via which the client terminal 10 is connected with an external MIDI device 8A. Operator unit 9 including various input operators, such as a keyboard and a mouse, are connected to the operator operation detection circuit 9.

Note that the client terminal 10 may be in the form of a personal computer or any other suitable communication terminal. It is just necessary that the client terminal 10 include means for performing bidirectional communication and means for writing and reading out data to and from the external recording medium 20 connected thereto.

As an example, the instant embodiment uses, as the external recording medium 20, Smart Media (registered trademark) or the like having previously recorded thereon a medium ID peculiar to, or unique to, the recording medium 20. In FIG. 2, exemplary recorded contents of the external recording medium 20 are illustrated in a conceptual manner. The medium ID 20a unique to the external recording medium 20 is prestored in a predetermined storage region, such as the header, of the medium 20, and one or more music piece data files 20b are storable in a content storage region with an additional ID imparted to each of the music piece data files 20b.

The additional ID is a unique ID based on the above-mentioned medium ID. By comparing the additional ID and medium ID, it is possible to identify a recording medium on which the music piece data file imparted with the additional ID should be recorded. The pre-recorded unique medium ID of the external recording medium 20 is read out via the read/write circuit 4, and an additional ID is generated on the basis of the thus read-out medium ID. In the instant embodiment, the medium ID of each external recording medium 20 is used also as the additional ID; that is, in each of the recording medium 20, the additional ID is set to coincide with the medium ID. Namely, the medium ID read out via the read/write circuit 4 is imparted, as the additional ID, to each music piece data file to be recorded on the external recording medium 20.

Figure 3:
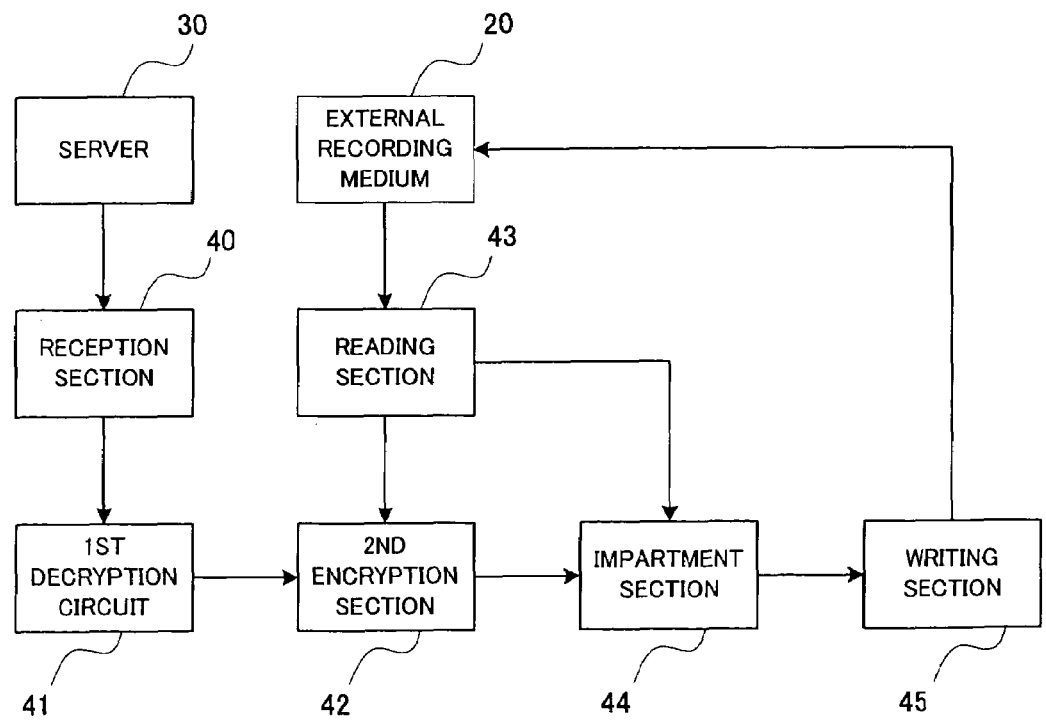
FIG. 3 is a functional block diagram showing functions explanatory of exemplary data writing operations performed in the embodiment.

FIG. 3 is a functional block diagram showing functions that are performed by the above-mentioned information recording program executed by the CPU 1. The following paragraphs describe an operational sequence of data recording processing performed on the external recording medium 20, with reference to FIG. 3. Note that a reception section 40 shown in FIG. 3 corresponds to the communication interface 5 of FIG. 2, and a reading section 43 and writing section 45 correspond to the read/write circuit 4 of FIG. 2. Note that various kinds of encryption to be described below may be performed by any suitable conventionally-known methods.

In response to a request given from any one of the client terminals 10, the server 30 transmits, to the client terminal 10, a music piece data file desired by the user of the client terminal 10, after encrypting the music piece data in accordance with a first encryption method; the music piece data thus encrypted with the first encryption method will be referred to as "first encrypted data". Here, the music piece data are encrypted by the server 30 with such a first encryption method, in order to achieve security of the data during transmission from the server 30 to the client terminal 10; the first encryption method used by the server 30 may be any suitable encryption method conventionally employed in data delivery via a communication network. The client terminal 10 receives the first encrypted data from the server 30 by means of the reception section 40, and decrypt the thus-received first encrypted data into the original music piece data by means of a first decryption section 41. The thus-decrypted music piece data are data organized in a predetermined format, such as a standard MIDI file (SMF) composed of a series of event data.

The reading section 43 reads out the medium ID from the external recording medium 20 removably attached to the client terminal 10. Second encryption section 42 encrypts the music piece data, given from the first decryption section 41, using the read-out medium ID and in accordance with a predetermined second encryption method (i.e., method using the read-out medium ID, in a different manner from the first encryption method, to encrypt the music piece data into form that can not be decrypted unless the unique medium ID of the recording medium 20 is used), to thereby generate second encrypted data. Thus encrypting the music piece data by use of the unique medium ID of a given external recording medium 20 to which the music piece data are to be downloaded is preferable from the viewpoint of data security, because it can reliably prevent reproduction of the music piece data in the event that the data are copied unfairly or unrightfully to another recording medium having a different medium ID.

Impartment section 44 creates or generates an additional ID corresponding to, or related to, the medium ID read out by the reading section 43; as noted earlier, in the instant embodiment, the medium ID of the recording medium is used also as the additional ID; that is, for each of the recording medium 20, the impartment section 44 generates an additional ID that coincides in content with the medium ID. The thus-generated additional ID is imparted to the file of the second encrypted data (i.e., music piece data encrypted in accordance with the second encryption method) given from the second decryption section 42. The writing section 45 writes, onto the external recording medium 20, the music piece data file of a single music piece, composed of the encrypted music piece data and additional ID given from the impartment section 44, as a single data set. If the music piece data file of each music piece includes a header section storing the name of the music piece etc. and a data section storing the music piece data, the additional ID may be stored in the header section. The music piece data file of the music piece, thus written on the external recording medium 20 as a single data set, is visually displayed, for example, as a single icon on the display section 6A by means of the display control circuit 6.

In the above-described manner, one or more music piece data files can be recorded on each external recording medium 20, depending on the recording capacity of the recording medium 20. In the instant embodiment, each of the music piece data files stored on the same external recording medium 20 has the same addition ID that coincides with the unique medium ID of the recording medium 20.

Whereas, in the illustrated example of FIG. 3, the respective functions of the above-mentioned sections 40-45 are performed through software processing by the CPU 1, they can of course be implemented by dedicated hardware devices.

Figure 4:
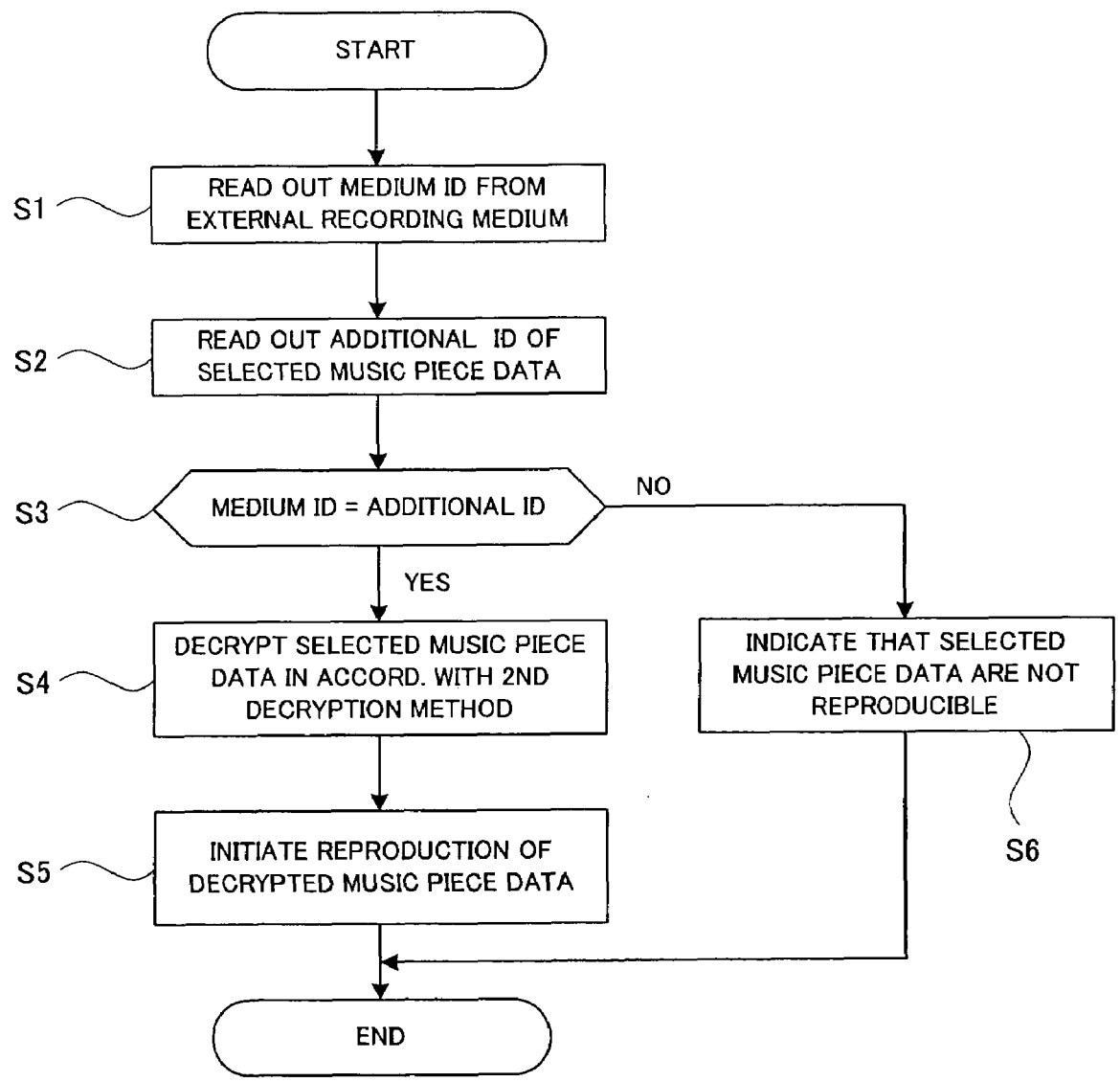
FIG. 4 is a flow chart explanatory of exemplary data reading operations performed in the embodiment.

FIG. 4 is a flow chart showing an exemplary operational sequence defined by the above-mentioned information reproducing program executed by the CPU 1. This and following paragraphs describe an example of processing for reproducing data recorded on an external recording medium 20, with reference to the flow chart of FIG. 4. The CPU 1 of the client terminal 10 reads out information of all music piece data files recorded on the external recording medium 20, creates a music piece selection listing (or music piece reproduction listing) on the basis of the read-out data, and visually displays the created music piece selection listing on the display section 6A of FIG. 2. Once the user of the client terminal 10 selects a music piece to be reproduced from the displayed selection listing, the following operations are carried out.

The CPU 1 reads out the unique medium ID of the external recording medium 20 at step S1, and then reads out the additional ID imparted to the selected music piece data file at step S2. Although, in the illustrated example, the unique medium ID of the external recording medium 20 is first read out followed by readout of the additional ID, the additional ID may be read out first. At next step S3, the read-out medium ID and read-out additional ID are compared to each other to determine whether or not both of the medium ID and additional ID meet a predetermined matching criterion or condition (in the instant embodiment, whether the medium ID and additional ID coincide with each other). If answered in the affirmative at step S3, the CPU 1 goes to steps S4 and S5, where the selected music piece data file is judged to be a reproducible object.

At step S4, the selected music piece data file is decrypted into the original music piece data in accordance with a second decryption method corresponding to the second encryption method with which the music piece data were encrypted; in the illustrated example, the selected music piece data file is decrypted in accordance with the second decryption method using the medium ID. Then, at step S5, the CPU 1 initiates reproduction of the decrypted music piece data.

If, on the other hand, the read-out medium ID and additional ID do not meet the predetermined matching criterion or condition as determined at step S3, the CPU 1 branches to step S6, where it indicates, by visual display on the display section 6A, voices or otherwise, that the selected music piece data file is not reproducible, after which the reproduction processing is brought to an end.

In the instant embodiment, because the medium ID and additional ID are set to coincide with each other, the decryption can be performed accurately through the operations of steps S4 and S5 of FIG. 4 when the music piece data, downloaded and recorded to the external recording medium 20 fairly or rightfully from the server 30, are to be reproduced from the recording medium 20. If, on the other hand, the external recording medium 20 to be used for reproduction has the music piece data unfairly or unrightfully copied from another recording medium, to which the music piece data were downloaded in a fair or rightful manner, then the unique medium ID of the external recording medium 20 to be used for reproduction differs from the additional ID imparted to the music piece data to be reproduced, so that the CPU 1 branches from step S3 to step S6. At step S6, it is promptly indicated to the user that the music piece data file is not reproducible; thus, in this case, the decryption operation of step S4 is not carried out at all. Namely, the instant embodiment of the present invention can promptly and readily determine whether or not the music piece data recorded on the recording medium 20 is a reproducible object, without actually decrypting the music piece data. As a result, the instant embodiment can perform the reproduction processing with an increased efficiency.

As a modification of the operational sequence of FIG. 4, a list editing process may be added, in a flow path following step S6, for effecting marking, deletion or the like of the music piece to be reproduced in the above-mentioned music piece reproduction listing. In the list editing process, there is performed an operation for deleting the music piece data file, having been determined as "non-reproducible" (NO determination at step S3), from the music piece reproduction listing pertaining to the recording medium 20, an operation for displaying, in the music piece reproduction listing. A predetermined mark to exclude the non-reproducible music piece data file from the music piece reproduction listing. Such operations can prevent the music piece, having been determined as "non-reproducible", from being selected next time the reproducing program of FIG. 4 is started.

Whereas the music piece data reproduction processing is shown in FIG. 4 as executed as software processing by the CPU 1, the reproduction processing may of course be executed by a dedicated hardware apparatus.

Further, whereas the embodiment of the present invention has been described in relation to the case where the external recording medium 20 has the unique medium ID previously recorded thereon, the basic principles of the present invention may also be applied to recording media where no medium ID is previously recorded thereon. In the case where a recording medium 20 having no unique medium ID previously recorded thereon is used in the client terminal 10, the client terminal 10 may create a medium ID unique to the medium 20 and then record the thus-created medium ID on the medium 20. For example, when music piece data are to be downloaded from the server 30, the client terminal 10 creates a unique medium ID for a recording medium 20 to be used and then write the thus-created medium ID onto the medium 20 to allow identification of the recording medium 20. Further, arrangements may be made for inhibiting use of any recording medium 20 having no unique medium ID recorded thereon; in this case, downloading of desired music piece data may be inhibited by canceling the data writing operation on the recording medium 20 at a time point when it is detected that no medium ID has been read out from the medium 20.

It should also be appreciated that the external recording media 20 to be used in the present invention may be any of writable/readable media, such as a flexible or floppy (registered trademark) disk (FD), compact disk (CD-ROM), magneto-optical disk (MO), digital versatile disk (DVD) and magnetic memory.

Whereas the data recording processing of the present invention has been described above in relation to the case where the additional ID and medium ID are set coincide with each other, the present invention is not so limited; for example, it is only necessary for the additional ID to be an unique ID created on the basis of the medium ID in such a manner that the additional ID is more or less related to the medium ID. Namely, the additional ID may be any suitable ID as long as its relationship with the corresponding medium ID can be ascertained and it permits a determination as to whether the music piece data file having the additional ID imparted thereto is a reproducible object. For example, the additional ID may be created by encrypting the corresponding medium ID with a predetermined encryption method. In such a case, the predetermined encryption method for creating the addition ID may employ the same algorithm as the above-described second encryption method for encrypting the music piece data, or an algorithm of a third encryption method different from the second encryption method. Further, the predetermined encryption method may be arranged to not use, as an encrypting keyword, the medium ID to be encrypted; alternatively, the predetermined encryption method may be arranged to use, as an encrypting keyword, the medium ID to be encrypted. In the case where the predetermined encryption method for creating the addition ID employs the same algorithm as the above-described second encryption method for encrypting the music piece data, there is advantageously achieved the benefit that the second encryption section 42 (FIG. 3) for encrypting the music piece data and the decryption means for decrypting the music piece data comprising the second encrypted data (second decryption method used at step S4 of FIG. 4) can be shared not only between the encryption and decryption of the music piece data but also between encryption and decryption of the medium ID used for creation of the additional ID.

Thus creating the additional ID by encrypting the medium ID will "double-encrypt" content to be recorded on the recording medium 20, thereby ensuring even further enhanced data security. Needless to say, in the case where the additional ID is created by encrypting the corresponding medium ID, the matching criterion or condition used at step S3 of FIG. 4 is established in view of the encryption method used for the additional ID. For example, an ID obtained by decrypting the encrypted additional ID and the medium ID may be compared for a match, or any other suitable matching condition may be established as appropriate.

Furthermore, whereas the embodiment of the present invention has been described above in relation to the case where a plurality of music piece data files to be recorded on the same recording medium 20 are imparted with a common or same additional ID, the present invention is not so limited; for example, a plurality of music piece data files to be recorded on the recording medium 20 may be imparted with different additional IDs. What is important here is that the music piece data files to be recorded on the recording medium 20 have respective additional IDs, unique to the recording medium 20, that are created on the basis of the medium ID of the recording medium 20 so as to correspond to the medium ID. For example, different additional IDs may be created for the individual data files by encrypting the medium ID in accordance with different predetermined algorithms corresponding to the data file numbers; namely, in this case, the additional ID of each of the data files is created by encrypting the medium ID using a predetermined algorithm different from those of the other data files to be recorded on the same recording medium 20.

In summary, the present invention is characterized in that, on the basis of a medium ID recorded on a recording medium as identification information unique to the recording medium, an additional ID related to the medium ID is generated and then the data are encrypted and recorded on the recording medium along with the additional ID. In reproduction, the medium ID and the additional ID attached to the data are read out from the recording medium, and then compared to each other to determine whether both of the medium ID and additional ID meet a predetermined matching criterion or condition. With such arrangements, the present invention can readily sort out data that can be set as a reproducible data and non-reproducible data, with the result that the invention can effectively prevent unfair or unauthorized copying or use of the data through simple and efficient processing.

The present invention relates to the subject matter of Japanese Patent Application No. 2002-201765 filed on Jul. 10, 2002, the disclosure of which is expressly incorporated herein by reference in its entirety.

What is claimed is:

1. An information recording apparatus comprising:
   an encryption section that encrypts data to be recorded on a recording medium;
   a generation section that, on the basis of a medium ID recorded as identification information unique to the recording medium, generates an additional ID related to the medium ID;
   a recording section that records the data, encrypted by said encryption section, on the recording medium along with the additional ID, said recording section records the encrypted data and the additional ID on the recording medium as a single data file; and
   a display section that visually displays, as a single data file, the encrypted data and the additional ID recorded on the recording medium.

2. An information recording apparatus as claimed in claim 1 wherein said generation section uses the medium ID also as the additional ID.

3. An information recording apparatus as claimed in claim 1 wherein said generation section generates the additional ID by encrypting the medium ID.

4. An information reproduction apparatus for reproducing data recorded on a recording medium, said information reproduction apparatus comprising:
   a first readout section that reads out, from the recording medium, a medium ID recorded as identification information unique to the recording medium, an additional ID related to the medium ID being also recorded on the recording medium in attached relation to the data;
   a second readout section that reads out, from the recording medium, the additional ID attached to the data;
   a determination section that compares the medium ID and the additional ID read out by said first and second readout sections and determines whether both the medium ID and the additional ID meet a predetermined matching condition; and
   a display section that visually displays, as a single data file, the data and the additional ID recorded on the recording medium,
   wherein, when the additional ID attached to the data has been determined by said determination section as meeting the predetermined matching condition, the data is judged to be reproducible data, and
   wherein, on the recording medium, the data is recorded along with the additional ID as a single data file.

5. An information reproduction apparatus as claimed in claim 4 wherein, on the recording medium, the medium ID is recorded also as the additional ID.

6. An information reproduction apparatus as claimed in claim 4 wherein, on the recording medium, information obtained by encrypting the medium ID, is recorded as the additional ID.

7. A program, embodied on a computer-readable medium, for causing a computer to execute an information recording method, said information recording method comprising:
   a step of encrypting data to be recorded on a recording medium;
   a step of, on the basis of a medium ID recorded as identification information unique to the recording medium, generating an additional ID related to the medium ID;
   a step of recording the data, encrypted by said step of encrypting, on the recording medium along with the additional ID, said step of recording records the encrypted data and the additional ID on the recording medium as a single data file; and
   a step of visually displaying as a single data file, the encrypted data and the additional ID recorded on the recording medium.

8. A program, embodied on a computer-readable medium, for causing a computer to execute an information recording method, said information recording method comprising:
   a step of reading out, from the recording medium, a medium ID recorded as identification information unique to the recording medium, an additional ID related to the medium ID being also recorded on the recording medium in attached relation to the data;
   a step of reading out, from the recording medium, the additional ID attached to the data;
   a step of comparing the medium ID and the additional ID read out by said steps of reading out and determining whether both the medium ID and the additional ID meet a predetermined matching condition; and
   a step of visually displaying, as a single data file, the encrypted data and the additional ID recorded on the recording medium,
   wherein, when the additional ID attached to the data has been determined by said step of comparing as meeting the predetermined matching condition, the data is judged to be reproducible data, and
   wherein, on the recording medium, the data is recorded along with the additional ID as a single data file.

* * * * *